United States Patent [19]

Wirpsza et al.

[11] Patent Number: 4,481,346
[45] Date of Patent: Nov. 6, 1984

[54] METHOD OF PRODUCING POLYMERS OF THE POLYURETHANE TYPE

[75] Inventors: Zygmunt Wirpsza, Warsaw; Krzysztof Kowalski, Chelm, both of Poland

[73] Assignee: Wyzsza Szkola Inzynierska Im. Kazimierza Pulaskiego, Malczewskiego, Poland

[21] Appl. No.: 510,831

[22] Filed: Jul. 5, 1983

[30] Foreign Application Priority Data

Jul. 20, 1982 [PL] Poland .................................. 237606

[51] Int. Cl.$^3$ .............................................. C08G 18/00
[52] U.S. Cl. ......................................... 528/73; 528/76; 528/80; 528/83; 528/162; 528/164; 528/248; 528/261; 528/266
[58] Field of Search ....................... 528/73, 76, 80, 83, 528/162, 164, 248, 261, 266

[56] References Cited

U.S. PATENT DOCUMENTS

| | | | |
|---|---|---|---|
| 3,652,507 | 3/1972 | Burk et al. | 260/77.5 AB |
| 3,702,320 | 11/1972 | Fritok et al. | 260/77.5 B |
| 3,931,425 | 1/1976 | Kuroda | 428/38 |
| 3,960,818 | 6/1976 | Spiewak | 260/77.5 C |
| 4,154,724 | 5/1979 | Schulze | 528/68 |
| 4,156,784 | 5/1979 | Dockner et al. | 560/157 |

FOREIGN PATENT DOCUMENTS

| | | |
|---|---|---|
| 1801403 | 5/1970 | Fed. Rep. of Germany . |
| 2459765 | 7/1976 | Fed. Rep. of Germany . |
| 2510730 | 9/1976 | Fed. Rep. of Germany . |
| 735601 | 5/1980 | U.S.S.R. . |

Primary Examiner—Maurice J. Welsh

[57] ABSTRACT

A method of producing polymers of the polyurethane type without the use of isocyanates is characterized by that compounds containing active atoms of hydrogen, preferably oligoesterols or oligoetherols, are amidated with isocyanic acid, preferably obtained "in statu nascendi", and then amide compounds thus obtained, preferably oligourethanes, oligoallophanates or oligourethanallophanates, are condensed with an aldehyde in a medium of pH not higher than 10, till obtaining a polymer.

It is preferable to amidate oligoesterols or oligoetherols with isocyanic acid obtained from urea in the presence of hydrochloride of a tertiary amine. Oligourethanes, oligoallophanates or oligourethanallophanates can be condensed alone with formaldehyde or in the presence of other compounds able to react with formaldehyde or their hydroxymethyl derivatives.

10 Claims, No Drawings

METHOD OF PRODUCING POLYMERS OF THE POLYURETHANE TYPE

The subject of the present invention is a method of producing polymers of the polyurethane type from compounds containing amide arrangements, and especially urethane or allophanate ones.

The hitherto known methods of producing polyurethanes, which are the most verstile plastics, consist in a reaction of macropolyols of molecular mass of 400–700 containing not less than two hydroxyl groups with diisocyanates, most often aromatic, or possibly in the presence of glycols or diamines as extenders. Polyurethanes include also polymers containing beside urethane bonds also other bonds: allophanate, urea, biuret, isocyanuric, ester, ether and other. However, the most significant of their characteristics polyurethanes owe to methane groups.

Isocyanates, being the source of methane groups in polyurethanes, are a toxic material, sensitive to humidity and contamination, expensive and unremunerative. They are obtained in a complicated chemical process of nitration, reduction and phosgenation with the use of a highly toxic compound—phosgene. This creates considerable hindrances in production of polyurethanes and limits the range of their application.

The known method of producing polyurethanes from compounds containing urethane groups consists in obtaining prepolymers from macropolyols and an excess of diisocyanates. Such a prepolymer, containing free isocyanate groups and urethane bonds is then extended and possibly crosslinked with diamines, glycols, macropolyols or a mixture thereof.

The invention presented herein is aimed at obtaining cheap polymers of characteristics similar to those of polyurethanes, without the use of isocyanates.

The essence of the invention consists in amidation of oligoesterols or oligoetherols containing at least two hydroxyl groups by attaching to them isocyanic acid, preferably obtained "in statu nascendi", and then by condensing the amide compounds thus obtained with 0.25–5.0 mole of an aldehyde, preferably formaldehyde, per gram-equivalent of primary amide groups in a medium of pH not higher than 10, preferably in an acid medium, till obtaining a polymer of the polyurethane type of the molecular mass bigger than that of the initial amide compound. Such a polymer can be linear, branched or crosslinked.

Isocyanic acid, amidating oligoesterols or oligoetherols, can be obtained, preferably "in statu nascendi", by thermal decomposition of urea, urethane, or by acidification of cyanate of a metal.

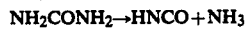

NH$_2$CONH$_2$→HNCO+NH$_3$

ROCONH$_2$→HNCO+ROH

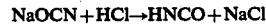

NaOCN+HCl→HNCO+NaCl

Isocyanic acid obtained therein attaches to atoms containing active atoms of hydrogen, producing amide arrangements, especially of hydroxyl groups of macropolyols, forming urethane (carbamate) groups, it can also attach to amide groups, forming polyamide arrangements, and especially to urethane groups—forming allophanate arrangements. For example:

R/OH/$_n$+nHNCO→R/OCONH$_2$/$_n$

R—OCONH$_2$+HNCO→ROCONHCONH$_2$

Characteristics of polymers of the polyurethane type are the better the more complete is the conversion of groups non-reactive in relation to formaldehyde, especially hydroxyl groups into amide arrangements reactive in relation to formaldehyde, especially urethane or allophanate arrangements. Therefore, it is necessary to apply methods of amidation securing possibly complete amidation of non-reactive groups containing active atoms of hydrogen, and practically quantitative amidation in case of compounds containing only two such groups. The amidation reaction of macropolyols proceeds rather with difficulty. It is preferable to amidate them with a mixture of urea and hydrochloride of tertiary amine, preferably pyridine hydrochloride, because hydrogen chloride accelerates decomposition of urea to isocyanic acid and binds ammonia released in the result of the reversible reaction of desamination, and non-reactive tertiary amine released thereat can be distilled off. The temperature of the amidation reaction in the presence of tertiary amine hydrochloride is usually determined from below by the breakdown temperature of urea (about 373° K.) and from above by the distillation temperature of amine and thermal strength of obtained amide arrangements (about 473° K.).

Among macropolyols the most preferable (most available and cheapest) are oligoetherols containing at least two hydroxyl groups separated from each other by an oligoester- or aligooxyalkylene chain of the formula

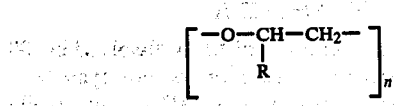

$$\left[ -O-CH-CH_2- \atop R \right]_n$$

where: R=H or CH$_3$ and n>2.

The obtained urethanes, allophanates or urethaneallophanates, especially oligomeric, are condensed with an aldehyde, preferably formaldehyde, which is the cheapest and the most reactive aldehyde, to polymers of the polyurethane type. The molar ratio of aldehyde to amide- or polyamide groups in the reaction mixture should be included within the limits of 0.25–5.0, preferably 0.5–2.0. Polycondensation proceeds the faster the lower is pH or the bigger is the acidity of the medium and the higher is the temperature. pH of the medium should not be higher than 10 because then isocyanic acid can split off from amide groups or they can hydrolyze.

Methylene bridges binding with themselves amide arrangements, preferably urethane or allophanate, increase twice the size of the stiff segment of the polymer. The ratio of the size of stiff segments to elastic segments determines the physicomechanical properties of polymers. If the size of doubled amide- or polyamide stiff segments is too small in relation to the size of an elastic segment, then additional stiff segments can be built in to the polymer. The reaction of compounds containing amide arrangements with an aldehyde is then conducted in the presence of other co-reacting compounds, such as urea, phenol, melamine and their derivatives. At cocondensation with such compounds it is necessary to increase correspondingly the amount of aldehyde. As such compounds are being introduced the elasticity of obtained polymers decreases and their stiffness increases. Formaldehyde can be introduced into the polycondensation reaction in a free form or in a form of hydroxymethylene derivatives of compounds able to react with formaldehyde, for example, dihydroxymethylolurea, trihydroxymethylmelamine, polyhydroxymethylophenol.

EXAMPLE I 5 g of polyoxyethylene glycol 400, 3 g of urea, 5.78 g of pyridine hydrochloride and 0.25 g of AlCl$_3$ are heated for 3 hours in a temperature of 373°–393° K., pyridine being distilled off. The reaction product is dissolved in acetone, filtered off and from the filtrate acetone is distilled off.

5.3924 g (0.0111 mole) of obtained polyoxyethylene urethaneallophanate 400 and 1.89 ml of 35.4% formalin (0.0222 mole of CH$_2$O) are placed in a three-necked flask of the capacity of 100 ml provided with a thermometer, a reflux condenser and an agitator, and stirred, alkalized with 1n NaOH to pH 7.6. The content of the flask is heated for 30 minutes in a temperature of 343° K. Next, 2.16 g of dihydroxymethylolurea is added (40% per the mass of urethaneallophanate) dissolved in 5 ml of distilled water of a temperature of 363° K. and is acidified with 1n HClO$_4$ to pH 1.0. After thorough mixing the solution is poured out to a mould and set-up for 20 minutes in a temperature of 363° K.

An elastomer of the polyurethane type is obtained, certain characteristics of which are specified in the table.

EXAMPLE II 40 g of polyoxyethylene glycol 400 is dissolved in 100 ml of dimethylformamide, 26 g of sodium cyanate is added, heated to a temperature of 393° K., and while intensely stirring, 14.6 g of gaseous hydrogen chloride is added. When acidity of the reaction mixture decreases to zero, the whole is cooled down to a room temperature and precipitate of sodium chloride is filtered off. The solvent is distilled off under lowered pressure, the product is diluted with acetone, filtered off again and acetone is distilled off. Polyoxyethylene urethaneallophanate 400 is obtained.

5.0101 g (0.0103 mole) of polyoxyethylene urethaneallophanate 400 and 1.7 ml of 35.4% of formalin (0.0206 mole of CH$_2$O) is placed in a flask as in example I, and neutralized with 1n NaOH to pH 7.2. The content of the flask is heated for 30 minutes in a temperature of 345° K. Next, 0.85 ml of 35.4% formalin (0.0103 mole of CH$_2$O) and 1.02 g (0.017 mole) of urea (20% per the mass of urethaneallophanate) is added. The mixture is acidified with 1n HClO$_4$ to pH 1.8, poured out to the mould and heated for 30 minutes in a temperature of 363° K. Polymer of the polyurethane type is obtained, whose characteristics are specified in the table.

| Characteristic | Unit of measure | Polymer from example I | Polymer from example II |
|---|---|---|---|
| Stress at 5% extension | MPa | 7.1 | 0.4 |
| Stress at 15% extension | MPa | 8.9 | 0.9 |
| Stress at 100% extension | MPa | — | 4.2 |
| Stress at breaking | MPa | 10.0 | 5.6 |
| Extension at breaking | % | 15 | 120 |
| Sorption of water vapour | % | 28.9 | 32.9 |
| Desorption of water vapour | % | 25.3 | 28.4 |

What is claimed is:

1. A method of producing polymers of the polyurethane type comprising amidating oligoesterols or oligoetherols by reacting them with isocyanic acid and condensing the amide compounds thus obtained with 0.25–5.0 mole of an aldehyde per gram-equivalent of primary amide groups in the compounds and in a medium of pH not higher than 10 for a time sufficient to form a polymer of molecular mass bigger that that of the initial amide compound.

2. A method according to claim 1, wherein the oligoetherol compounds are of the formula

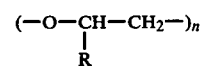

where R=—H or —CH$_3$ and n>2.

3. A method according to claim 1, wherein isocyanic acid which amidates said compounds containing active atoms of hydrogen is formed "in statu nascendi", including those formed by decomposition of urea.

4. A method according to claim 1, wherein the amide compounds formed as a result of amidation of oligoesterols or oligoetherols are oligoetherourethanes, oligoesterourethanes, oligoetheroallophanates, oligoesteroallophenates, oligoetherourethaneallophanates or oligoesterourethaneallophanates.

5. A method according to claim 1, wherein the compounds subjected to condensation with aldehyde are selected from oligoetherourethanes, oligoesterourethanes, oligoetherallophanates, oligoesterallophanates, oligoetherourethaneallophanates or oligoesterourethanallophanates, obtained by amidation, with an equimolar mixture of urea and hydrochloride of a tertiary amine of oligoesterols or oligoetherols containing at least two hydroxyl groups separated from each other by an oligoester—or oligooxyalkylene chain.

6. A method according to claim 1, wherein the aldehyde is formaldehyde.

7. A method according to claim 6 wherein condensation with formaldehyde is conducted in an acid medium.

8. A method according to claim 1, wherein the amide compounds are condensed with the aldehyde at from about 0.5 to 2.0 mole of aldehyde per gram equivalent of primary amide groups.

9. A method according to claim 1 wherein the amide compounds obtained as the result of amidation of oligoesterols or oligoetherols are condensed with formaldehyde in the presence of other compounds able to react with formaldehyde selected from urea, phenol, melamine and derivatives thereof, at a molar ratio of formaldehyde to the sum of primary amide groups and reactive centres of phenol in the reaction mixture within the limits of 0.25–5.0.

10. A method according to claim 1 wherein amide compounds obtained as the result of amidation of oligoesterols or oligoetherols are condensed with formaldehyde, at least part of which is in the form of hydroxymethyl derivatives of compounds able to bind formaldehyde.

* * * * *